(12) United States Patent
Colgan et al.

(10) Patent No.: US 6,278,502 B1
(45) Date of Patent: Aug. 21, 2001

(54) PIXEL CAPACITOR FORMED FROM MULTIPLE LAYERS

(75) Inventors: Evan George Colgan, Chestnut Ridge; Kai Richard Schleupen, Yorktown Heights, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/161,915

(22) Filed: Sep. 28, 1998

(51) Int. Cl.[7] .................................................. G02F 1/1345
(52) U.S. Cl. ................................................................ 349/38
(58) Field of Search ................... 349/43, 38, 39

(56) References Cited

U.S. PATENT DOCUMENTS

| | | |
|---|---|---|
| 3,824,003 | 7/1974 | Koda et al. . |
| 4,040,073 | 8/1977 | Luo . |
| 4,431,271 | 2/1984 | Okubo . |
| 5,173,791 | 12/1992 | Strathman et al. . |
| 5,182,661 | 1/1993 | Ikeda et al. . |
| 5,235,448 | 8/1993 | Suzuki et al. . |
| 5,285,302 | 2/1994 | Wu . |
| 5,305,128 | 4/1994 | Stupp et al. . |
| 5,402,254 | 3/1995 | Sasano et al. . |
| 5,483,082 | 1/1996 | Takizawa et al. . |
| 5,528,396 | 6/1996 | Someya et al. . |
| 5,536,950 | 7/1996 | Liu et al. . |
| 5,580,796 | 12/1996 | Takizawa et al. . |
| 5,583,369 | 12/1996 | Yamazaki et al. . |
| 5,672,888 * | 9/1997 | Nakamura ................................ 257/72 |
| 5,982,460 * | 11/1999 | Zhang et al. ............................ 349/39 |
| 6,100,947 * | 8/2000 | Katayama ............................... 349/38 |

* cited by examiner

*Primary Examiner*—Kenneth Parker
(74) *Attorney, Agent, or Firm*—F. Chau & Associates, LLP (57) ABSTRACT

A storage device for display cells, in accordance with the present invention, includes a first conductive layer, a second conductive layer having a first side and a second side, the sides being opposite each other. The first conductive layer is spaced apart from the first side of the second conductive layer. A third conductive layer is spaced apart from the second side of the second conductive layer and is formed from a portion of a transparent layer used for constructing pixels of the display cells. The first and third conductive layers are electrically isolated from the second conductive layer. An interconnect is included for electrically coupling the first and third conductive layers such that the first and third conductive layers are included in a first electrode of the storage device and the second conductive layer includes a second electrode of the storage device. A method for fabrication of the storage device is also included.

21 Claims, 7 Drawing Sheets

PIXEL CAPACITOR FORMED FROM MULTIPLE LAYERS

BACKGROUND OF THE INVENTION

1. Field of the Invention

The present invention relates to capacitors for pixel display circuits and, more particularly, to a novel storage capacitor and method of fabrication for providing a capacitive device having reduced crosstalk and lower loss of charge.

2. Description of the Related Art

Thin film transistors (TFTs) are particularly useful in liquid crystal displays (LCDs) for active matrix display devices. TFT-LCD devices have the advantage of low power consumption.

Figure 1:
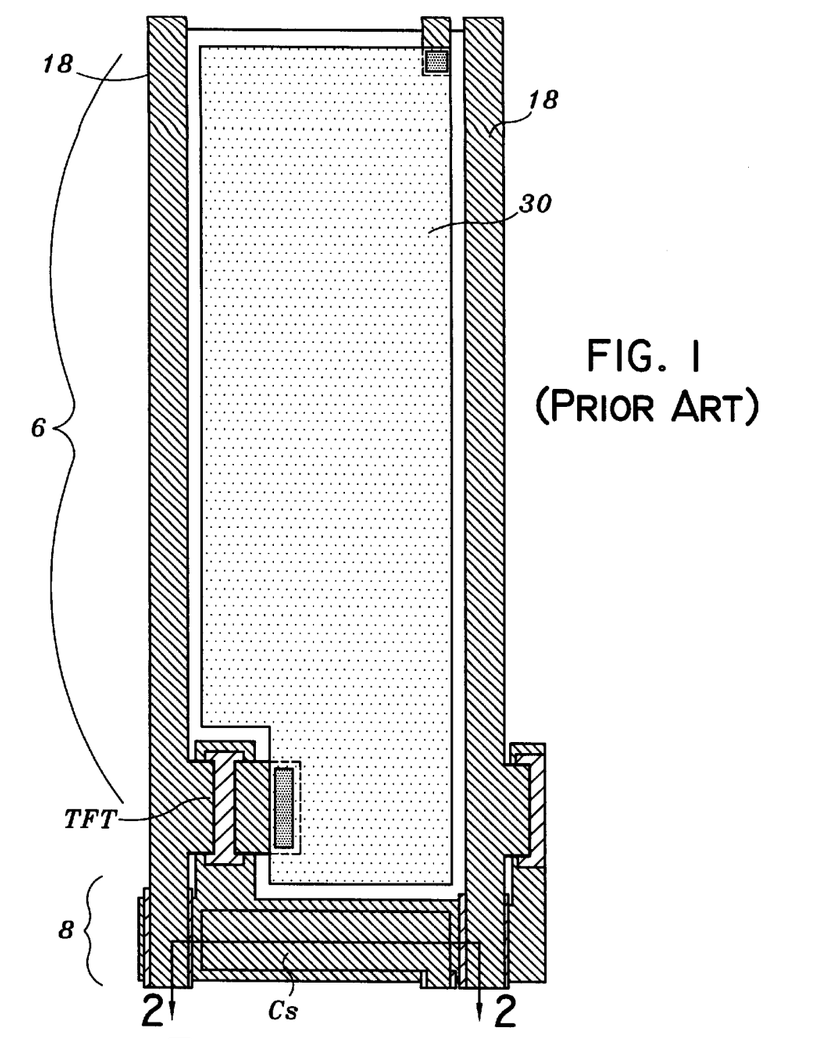
FIG. 1 is a top plan view of a pixel cell in accordance with the prior art.
Figure 2:
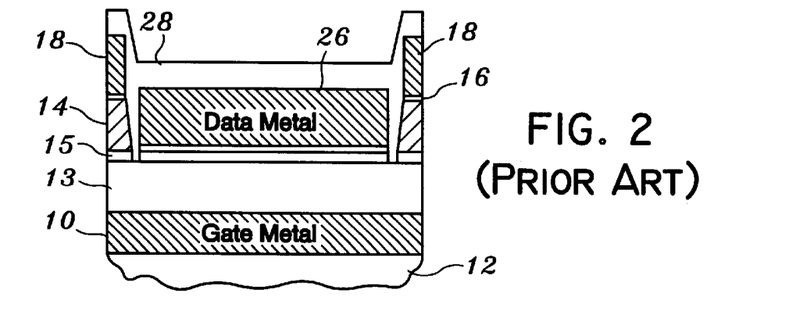
FIG. 2 is a cross-sectional view of the pixel cell taken at section line 2—2 of FIG. 1 showing a storage capacitor in accordance with the prior art.

Referring to FIGS. 1 and 2, a TFT matrix display cell 2 includes a pixel region 6 and a storage capacitor region 8. A gate metal layer 10 is disposed on a substrate 12. An amorphous silicon (a-Si:H) layer 15 is formed on a gate insulating film 13 followed by a dielectric layer 14, generally silicon nitride (SiNx), and an N+ doped a-Si layer 16. Metal lines 18 contact layer 16 and are disposed along the sides of a pixel region 6. A data metal layer 26 and N+ doped a-Si layer 16 are deposited on a portion of dielectric layer 14 and a portion of a-Si:H layer 15. Data metal layer 26 is covered by a passivation film 28.

A transparent electrode 30 is deposited over pixel region 6 and provides a connection to a source electrode through a window in passivation film 28. Transparent electrode 30 typically includes indium-tin oxide (ITO).

A storage capacitance electrode (Cs) is placed in storage capacitor region 8. Since TFTs access to storage capacitor Cs are formed simultaneously with Cs, gate metal layer 10 is used to form a first capacitor electrode (gate metal 10) as well as gate electrodes for TFTs. Similarly, gate insulating layer 13, which insulates gates of the TFTs, is formed on the first capacitor electrode and functions as a capacitor dielectric material between gate metal layer 10 and data metal layer 26. Data metal 26 functions as a counter electrode to the storage capacitor's first electrode (gate metal 10).

The first electrode and the counter electrode form a storage capacitance unit. The storage capacitance unit's purpose is to maintain voltage at the pixel electrode within specified limits for a predetermined amount of time after the TFT has been turned off. The storage capacitor may have difficulty in maintaining pixel voltage due to current leaks.

Further, with decreasing sizes of pixels with each active matrix display design generation makes it increasingly more difficult to provide sufficient capacitance. As a result, affected pixels tend to "turn on" when written "off" and thereby degrade image quality.

Figure 3:
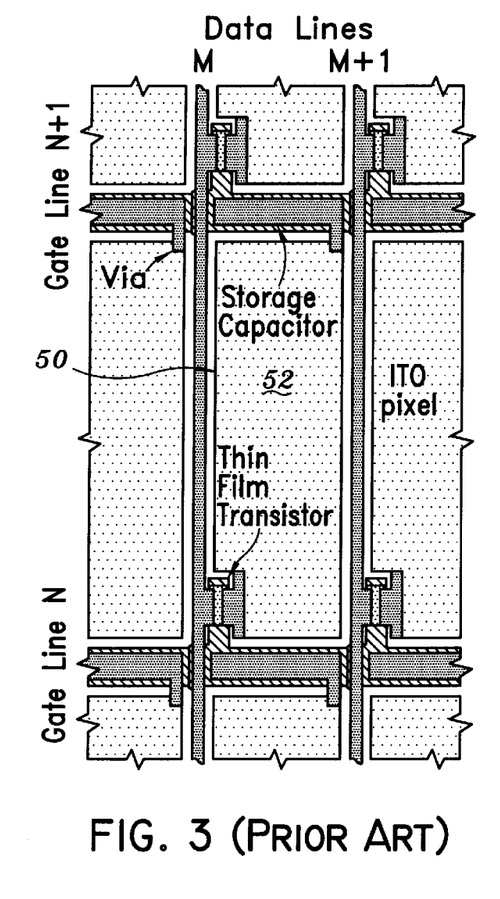
FIG. 3 is a top plan view of the pixel cell of FIG. 1 showing gate lines and data lines in accordance with the prior art.
Figure 4:
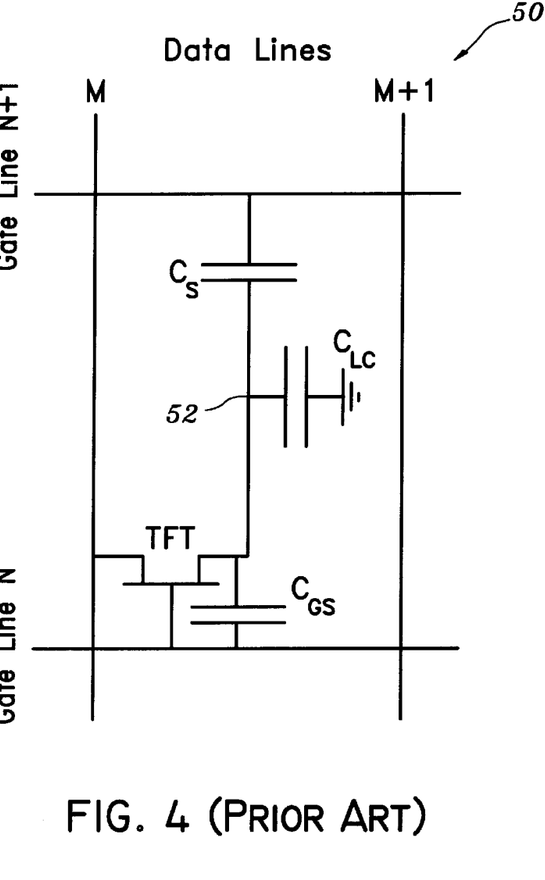
FIG. 4 is a schematic diagram for a pixel cell circuit of the pixel cell FIG. 3 in accordance with the prior art.

Referring to FIGS. 3 and 4, a pixel cell 50 is shown and a method for driving pixel 50 is described. Pixel cell 50 includes data lines M and M+1 and gate lines N and N+1 used for activating a pixel 52. A TFT is activated by gate line N and conducts between data line M and pixel 52. A storage capacitor Cs is included as described above. Other capacitors are included, such as, a gate source channel overlap capacitor, $C_{GS}$, and a liquid crystal capacitance $C_{LC}$ which also prevent charge leaks from pixel 52. $C_{LC}$ is the capacitance between pixel electrode 30 and a common electrode on the inside of a color filter.

A driving method for activating pixel cell 52 includes placing a voltage level corresponding to a desired grey value on data line M. Gate line N+1 is held low to turn off a TFT of the previous line and provides a firm voltage potential to the first capacitor electrode (gate metal 10 in FIG. 2)) of storage capacitor Cs. Gate line N is then held high. This turns on the TFT of cell 50. Charge is transferred from data line M to pixel 52 and storage capacitor Cs until pixel 52 reaches the same voltage as data line M. The voltage level defines the grey value by determining how much of a liquid crystal of pixel 52 gets rotated between polarizers (not shown) and therefore determines the optical transmission through cell 50. Cs keeps voltage drop due to leakage currents in cell 50 during not-addressed time during one frame within specified limits and also to keep capacitive coupling (e.g., crosstalk) within specified limits. It is desirable to have a large Cs to improve image quality, but this reduces the area of the pixel electrode, 30, and hence the aperture ratio (fraction of area through which light is transmitted). A balance must be achieved between a high aperture ratio and Cs size.

Therefore, a need exists for a storage capacitor for active matrix displays providing increased capacitive area while reducing current leakage and crosstalk without reducing the aperture ratio. A further need exists for a larger storage capacitor that provides reduced crosstalk by decreasing the ratio of parasitic capacitances to storage capacitance.

SUMMARY OF THE INVENTION

A storage device for display cells, in accordance with the present invention, includes a first conductive layer, a second conductive layer having a first side and a second side, the sides being opposite each other. The first conductive layer is spaced apart from the first side of the second conductive layer. A third conductive layer is spaced apart from the second side of the second conductive layer and is formed from a portion of a transparent layer used for constructing pixels of the display cells. The first and third conductive layers are electrically isolated from the second conductive layer and electrically isolated from pixel electrodes. An interconnect is included for electrically coupling the first and third conductive layers such that the first and third conductive layers are included in a first electrode of the storage device and the second conductive layer includes a second electrode of the storage device.

A storage device for use with a liquid crystal cell, in accordance with the present invention, includes a first conductive layer integrated on a substrate, a second conductive layer disposed apart from the first conductive layer and a third conductive layer disposed apart from the second conductive layer. The third conductive layer is patterned to be electrically isolated from pixel electrodes and formed concurrently with a transparent pixel electrode. A first insulating layer is disposed between the first and second conductive layers and a second insulating layer is disposed between the second and third conductive layers wherein the second conductive layer is electrically isolated from the first and third conductive layers. A first via is included for electrically coupling the first and third conductive layers.

In alternate embodiments, the first conductive layer may be associated with a gate metal layer and the second conductive layer may be associated with a data metal layer which are used to form other devices of the display cell, such as TFTs. The third conductive layer preferably includes indium tin oxide or indium zinc oxide. The interconnect may include a via, the connection through the via may be formed by the third conductive layer. The second conductive layer is preferably electrically coupled to a transparent pixel electrode for a pixel. The second conductive layer may be coupled to the transparent pixel electrode by a via formed from the third conductive layer. The second conductive layer may include aluminum and the third conductive layer may include indium zinc oxide.

In still other embodiments, the first via may be formed with the third conductive layer. The second conductive layer may be coupled to the transparent pixel electrode by a second via formed with the third conductive layer.

A method for fabricating a storage device for pixels on active displays includes the steps patterning a gate metal on a substrate, depositing a first insulation layer on the gate metal and the substrate, patterning a data metal on the first insulating layer, applying a passivation layer on the data metal and patterning a transparent layer on the passivation layer wherein a first portion of the transparent layer includes a transparent pixel electrode and a second portion of the transparent layer includes a capacitor electrode portion, the capacitor electrode portion being electrically isolated from the pixel electrode, and a via, the via for electrically coupling the gate metal to the capacitor electrode portion.

In other methods, the transparent layer may include indium tin oxide or indium zinc oxide. The step of forming the via with the transparent layer may be included. The step of forming a second via for electrically coupling the data metal to the transparent pixel electrode may also be included. The step of forming the second via with the transparent layer may also be included. The data metal may include aluminum and the transparent layer may include indium zinc oxide.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

The present invention relates to capacitors for pixel display circuits and, more particularly, to a novel storage capacitor and method of fabrication for providing a capacitive device having increased capacitance per unit area, reduced crosstalk and reduced leakage. The capacitor structure preferably includes three conductive layers disposed within an active crystal display. One conductive layer functions as a first conductive plate and two conductive layers function as a second conductive plate. The two conductive layers of the second plate are electrically coupled. The first capacitive plate is disposed between the two conductive layers of the second capacitive plate thereby increasing the area of the capacitor in accordance with the invention. The first and second capacitor electrodes are separated by at least one dielectric layer which functions as a capacitor dielectric.

The present invention preferably utilizes a liquid crystal pixel cell to realize the storage capacitor as described. A gate electrode, a data electrode and a transparent electrode are used to provide the three conductive layers which function as the storage node. The present invention further includes a method for fabricating the storage capacitor described above and advantageously takes advantage of fabrication steps currently in use to produce the novel storage capacitor.

Figure 5:
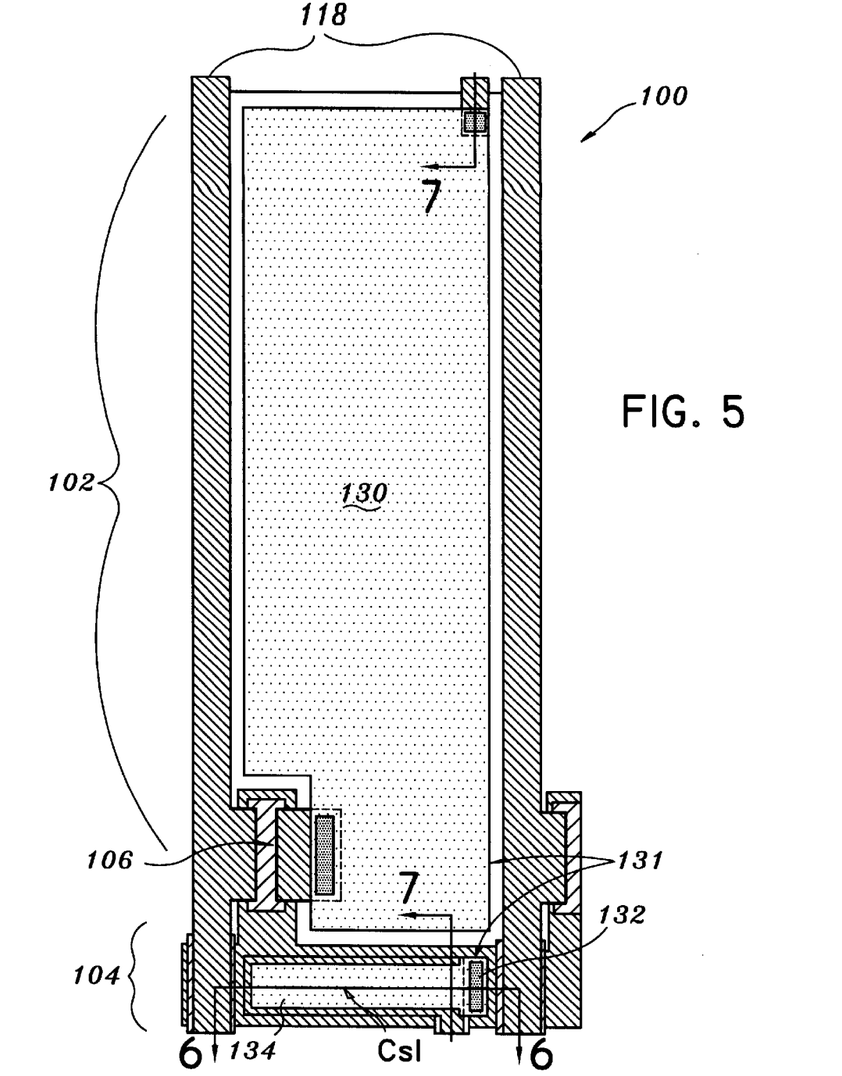
FIG. 5 is a top plan view of a pixel cell in accordance with the present invention.

Referring now to the drawings in which like numerals represent the same or similar elements and initially to FIG. 5, a pixel cell 100 is shown for an active matrix display device. Pixel cell 100 includes a pixel region 102 and a storage capacitor region 104. A transistor 106 is preferably a TFT. Data lines 118 are provided to access TFT and storage capacitor Cs1.

Figure 6:
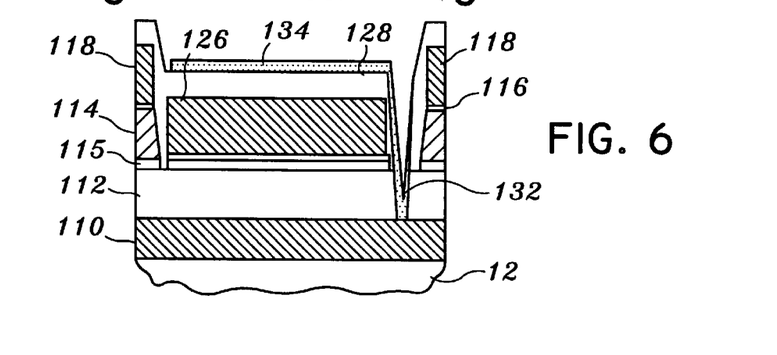
FIG. 6 is a cross-sectional view of the pixel cell taken at section line 6—6 of FIG. 5 showing a storage capacitor in accordance with the present invention.

Referring to FIG. 6, a gate metal 110 is disposed on a transparent insulating substrate 12. An amorphous silicon (a-Si:H) layer 115 is formed on gate insulating layer 112 and is followed by a dielectric layer 114, for example silicon nitride (SiNx), and an N+ doped a-Si layer 116. Data lines 118 contact layer 116 and are disposed along the sides of a pixel region 102. A data metal 126 is deposited on a portion of dielectric layer 114 and a portion of a-Si:H layer 115. Data metal 126 is covered by a passivation layer 128.

In accordance with the present invention, a transparent layer 131 is deposited over both pixel region 102 and storage capacitor region 104. Transparent layer 131 preferable includes indium-tin oxide (ITO) or indium-zinc oxide. A via or interconnect 132 is provided through passivation layer 128 and/or gate insulating layer 112 to expose data metal 126 and/or gate metal 110 an then depositing the transparent conductor material to electrically interconnect gate metal 110 and/or data metal 126. It is preferable to form the openings in the insulating layers with tapered edges to ensure adequate coverage by the transparent conductor material. Transparent layer 131 and via 132 are preferably formed simultaneously during the same process step.

Transparent layer 131 is patterned to provide a capacitor electrode portion 134 in storage capacitor region 104 and a transparent electrode 130 in pixel region 102. According to the present invention, storage capacitor Cs1 includes gate metal 110 as a first conductor, data metal 126 as a second conductor and capacitor electrode portion 134 as a third conductor.

Capacitor electrode portion 134 and gate metal 110 are electrically coupled by via 132, hence forming a first capacitor electrode 136 (see FIG. 7) surrounding data metal 126. Via 132 is preferably formed simultaneously with and using the same material as transparent electrode 130 and capacitor electrode portion 134. Data metal 126 therefore functions as a counter electrode. In this way, the capacitance of capacitor Cs1 is increased, for example, by about two times as compared with a typical Cs design using the same area. Advantageously, greater capacitance is achieved per unit area.

Figure 7:
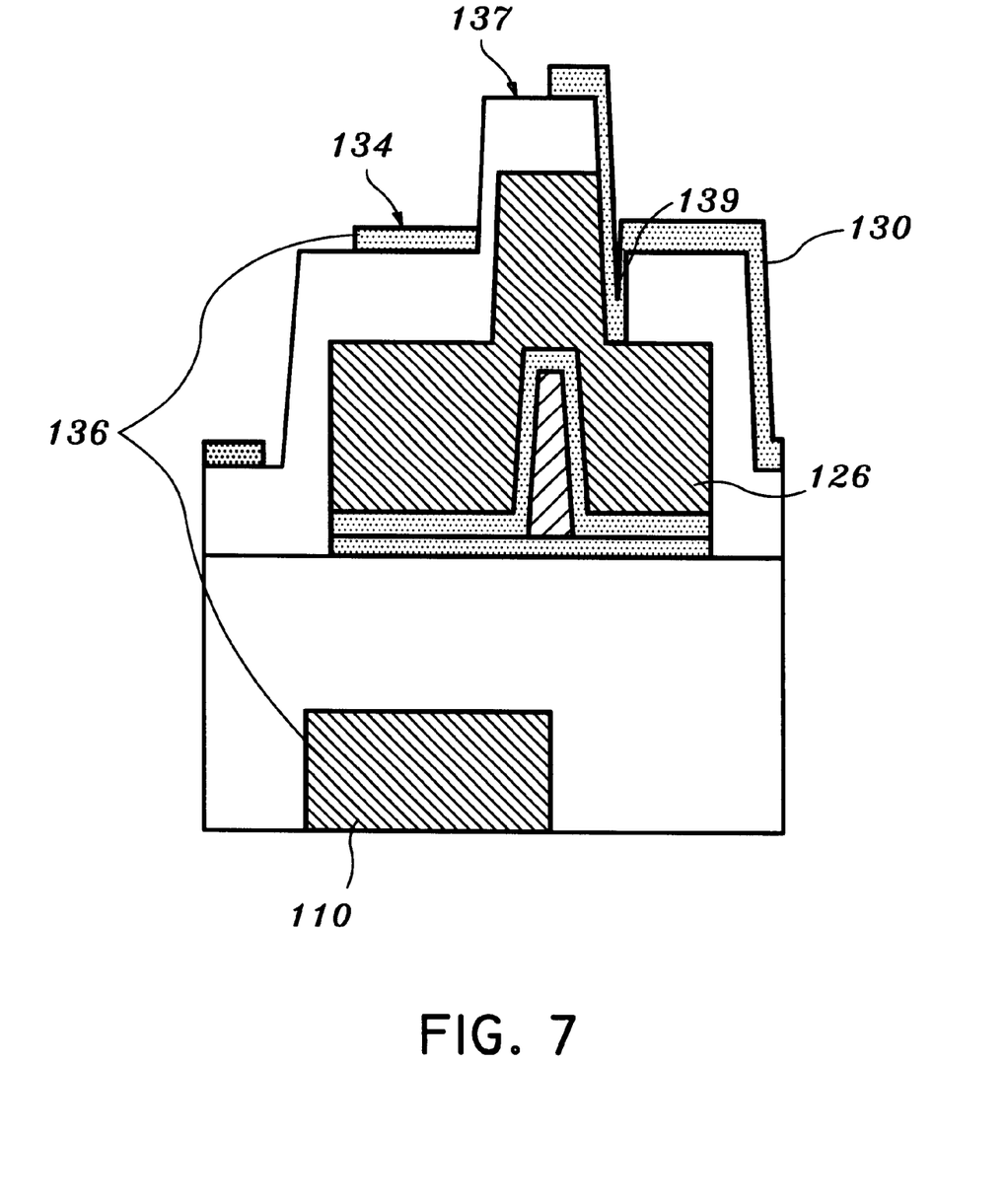
FIG. 7 is a cross-sectional view of the pixel cell taken at section line 7—7 of FIG. 5 showing the storage capacitor in accordance with the present invention.

Referring to FIG. 7, a cross-sectional view of storage capacitor region 104 is shown. A space or gap 137 is shown between transparent electrode 130 in pixel region 102 and capacitor electrode portion 134. Data metal 126 is preferably electrically coupled to transparent electrode 130 by a via 139. Via 139 is preferably formed concurrently with and of the same material as transparent electrode 130.

Transistor 106 is used to access a storage capacitor on a previous gate line (not shown). Transistor 106 is formed simultaneously with capacitors including Cs1. Many of the process steps used to fabricate storage capacitor Cs1, in accordance with the present invention, may advantageously be integrated into the same fabrication process as the other components on the display device. The following describes the fabrication of pixel cell 100 in accordance with the present invention.

Figure 8:
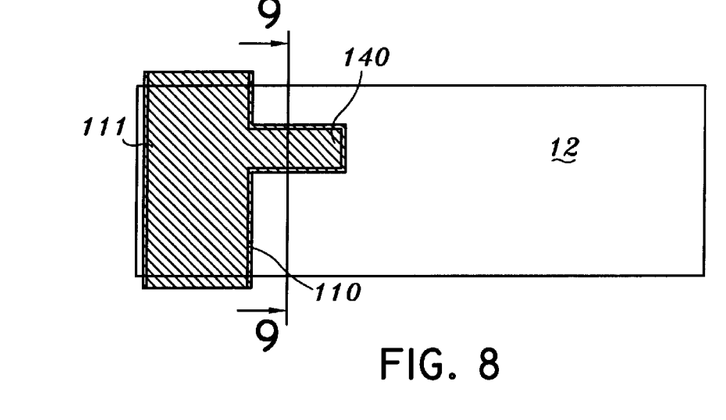
FIG. 8 is a top plan view showing a gate metal deposited for a pixel cell in accordance with the present invention.
Figure 9:
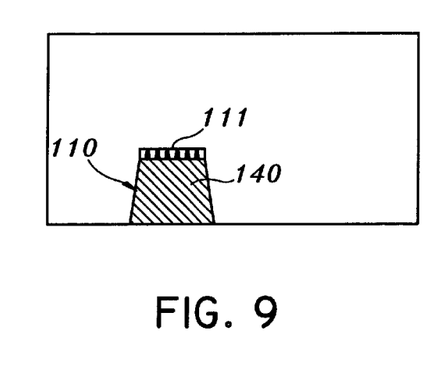
FIG. 9 is a cross-sectional view of the pixel cell taken at section line 9—9 of FIG. 8 in accordance with the present invention.
Figure 10:
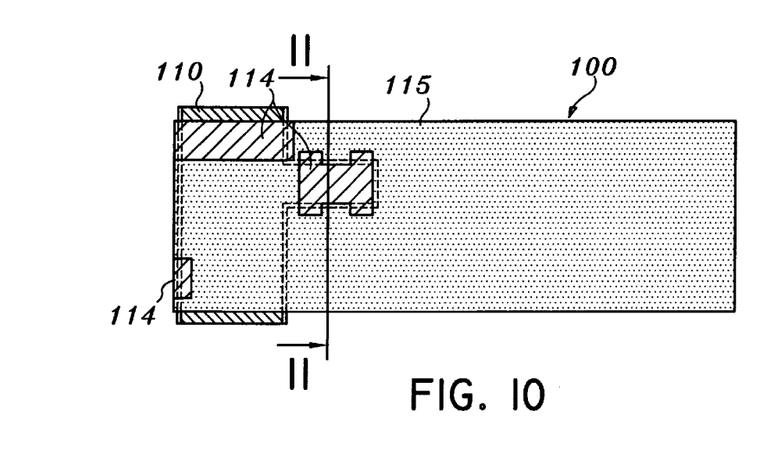
FIG. 10 is a top plan view showing a patterned dielectric layer on an amorphous silicon layer formed on the pixel cell of FIG. 8 in accordance with the present invention.
Figure 11:
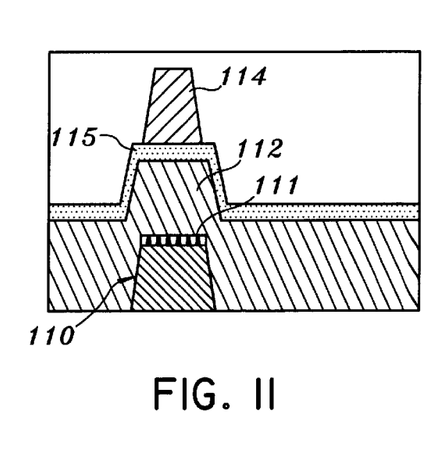
FIG. 11 is a cross-sectional view of the pixel cell taken at section line 11—11 of FIG. 10 in accordance with the present invention.

Referring to FIGS. 8 and 9, gate metal 110 is deposited on substrate 12. Gate metal 110 may include aluminum or copper or an alloy thereof, and preferably includes a cap 111 which may include a metal such as molybdenum. Gate metal 110 is included in storage capacitor Cs1 as described above, and includes an-extended portion 140 which is used as a gate metal for transistor 106. As shown in FIGS. 10 and 11, gate insulation layer 112 and a-Si layer 115 are deposited for pixel cell 100. Dielectric layer 114 is deposited on a-Si layer 115 and patterned as shown in FIG. 10.

Figure 12:
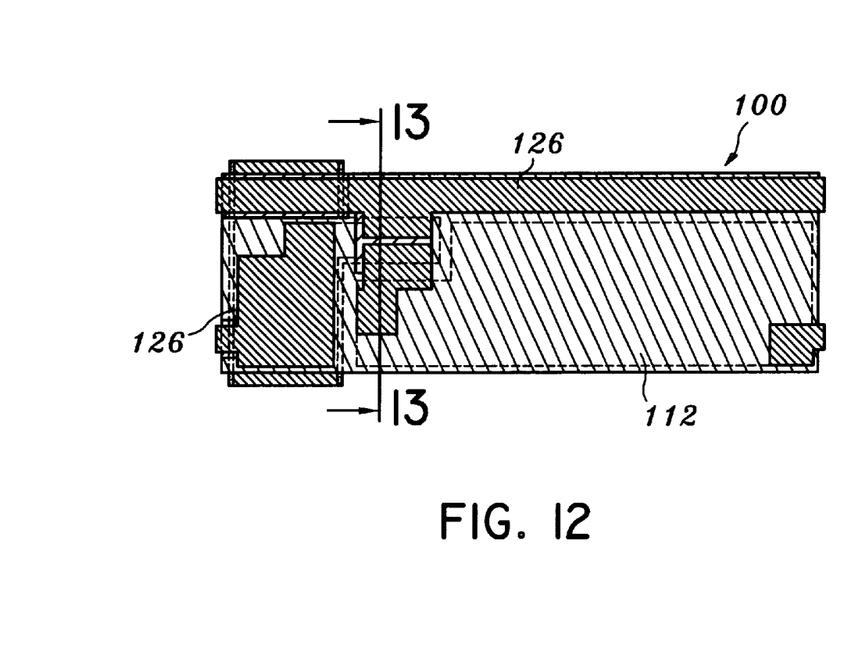
FIG. 12 is a top plan view showing a patterned data metal on the pixel cell of FIG. 10 in accordance with the present invention.
Figure 13:
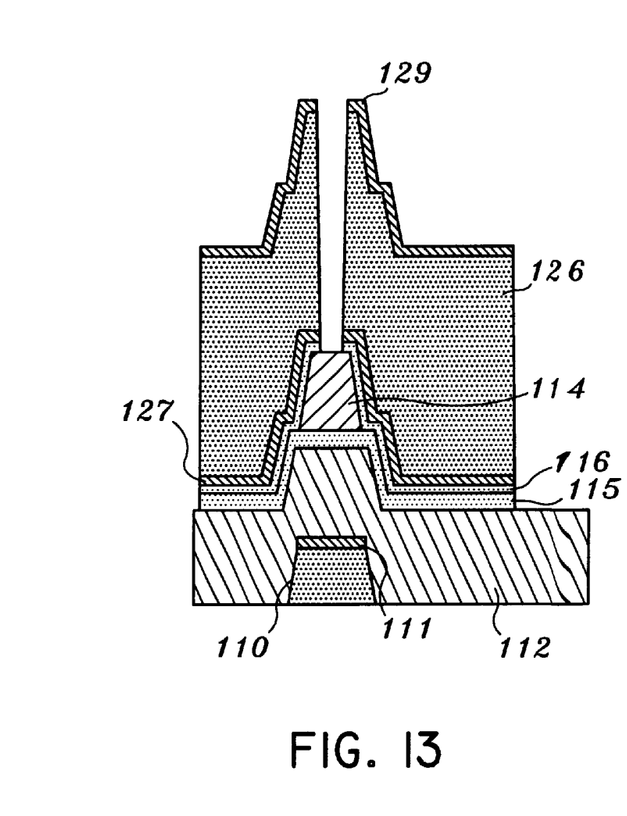
FIG. 13 is a cross-sectional view of the pixel cell taken at section line 13—13 of FIG. 12 in accordance with the present invention.
Figure 14:
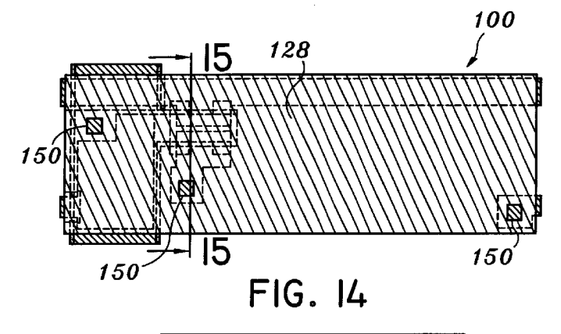
FIG. 14 is a top plan view showing a passivation layer formed on the pixel cell of FIG. 12 in accordance with the present invention.
Figure 15:
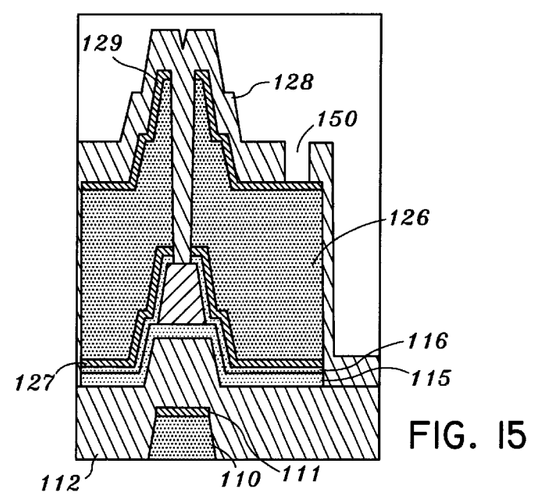
FIG. 15 is a cross-sectional view of the pixel cell taken at section line 15—15 of FIG. 14 in accordance with the present invention.
Figure 16:
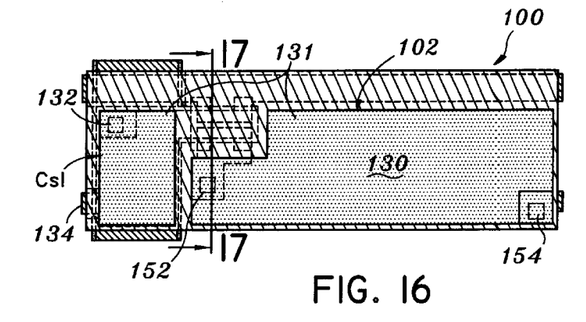
FIG. 16 is a top plan view showing a patterned transparent layer formed on the pixel cell of FIG. 14 in accordance with the present invention.
Figure 17:
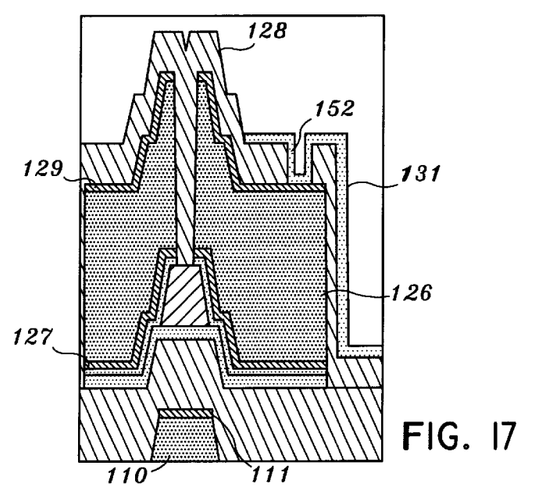
FIG. 17 is a cross-sectional view of the pixel cell taken at section line 17—17 of FIG. 16 in accordance with the present invention.

Referring to FIGS. 12 and 13, N+ a-Si layer 116 and data metal 126 are deposited. Data metal 126 may include a composite layer having layers 127 and 129. Layers 127 and 129 may provide, among other things diffusion protection. In a preferred embodiment data metal includes molybdenum for layers 127 and 129 which sandwich an aluminum layer of data metal 126. N+ a-Si layer 116 and data metal 126 are then patterned as shown. Data metal 126 provides the second conductor of Cs1, material for data lines 118 and material for other components in pixel cell 100. Data metal may include aluminum or other suitable conductive materials. As shown in FIGS. 14 and 15, passivation layer 128 is deposited for pixel cell 100. Passivation layer 128 is patterned to form holes 150 for the formation of via 132 and vias 152 and 154 (FIG. 16). As shown in FIGS. 16 and 17, transparent layer 131 is deposited over both pixel region 102 and storage capacitor region 104. Transparent layer 131 preferable includes indium-tin oxide (ITO) or indium-zinc oxide. Transparent layer 131 is then patterned to form capacitor electrode portion 134 and transparent electrode 130. Vias 132, 152 and 154 are preferably formed during the deposition of transparent layer 131.

Although described in terms of an amorphous silicon device, it is to be understood that the present invention may be implemented with various semiconductor technologies, for example, crystalline silicon, amorphous silicon, polysilicon, organic materials, Si—Ge and/or CdSe. The embodiments of the present invention may be implemented on any active matrix display without significantly impacting conventional fabrication processes. In preferred embodiments, the displays are used in lap top computers or other electronic devices having LCDs.

Having described preferred embodiments of pixel capacitor and method of fabrication (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A storage device for display cells comprising:
   a first conductive layer formed from a gate metal;
   a second conductive layer formed from a data metal and having a first side and a second side, the sides being opposite each other, the first conductive layer being spaced apart from the first side of the second conductive layer;
   a third conductive layer spaced apart from the second side of the second conductive layer and formed from a portion of a transparent conductive layer used for constructing pixels of the display cells, the first and third conductive layers being electrically isolated from the second conductive layer and electrically isolated from pixel electrodes; and
   a first interconnect for electrically coupling the first and third conductive layers such that the first and third conductive layers are included in a first electrode of the storage device and the second conductive layer is a second electrode of the storage device.

2. The device as recited in claim 1 wherein the third conductive layer includes indium tin oxide.

3. The device as recited in claim 1 wherein the third conductive layer includes indium zinc oxide.

4. The device as recited in claim 1 wherein the interconnect includes a via, the via being formed by the third conductive layer.

5. The device as recited in claim 1 wherein the second conductive layer is electrically coupled to a transparent pixel electrode for a pixel.

6. The device as recited in claim 5 wherein the second conductive layer is coupled to the transparent pixel electrode by a via formed from the third conductive layer.

7. The device as recited in claim 1 wherein the second conductive layer includes aluminum.

8. A storage device for use with a liquid crystal cell comprising:

a first conductive layer integrated on a substrate and formed from a gate metal;

a second conductive layer disposed apart from the first conductive layer and formed from a data metal;

a third transparent conductive layer disposed apart from the second conductive layer and formed concurrently with a transparent pixel electrode and patterned to be electrically isolated from pixel electrodes;

a first insulating layer disposed between the first and second conductive layers;

a second insulating layer disposed between the second and third conductive layers wherein the second conductive layer is electrically isolated from the first and third conductive layers; and a first via electrically coupling the first and third conductive layers.

9. The device as recited in claim 8 wherein the third conductive layer includes indium tin oxide.

10. The device as recited in claim 8 wherein the third conductive layer includes indium zinc oxide.

11. The device as recited in claim 8 wherein the first via is formed with the third conductive layer.

12. The device as recited in claim 8 wherein the second conductive layer is electrically coupled to the transparent pixel electrode.

13. The device as recited in claim 12 wherein the second conductive layer is coupled to the transparent pixel electrode by a second via formed with the third conductive layer.

14. The device as recited in claim 8 wherein the second conductive layer includes aluminum.

15. A method for fabricating a storage device for pixels on active matrix displays comprising the steps:

patterning a transparent conductive layer on the patterning a gate metal on a substrate;

depositing a first insulation layer on the gate metal and the substrate;

patterning a data metal on the first insulating layer;

applying a passivation layer on the data metal; and patterning a transparent conductive layer wherein a first portion of the transparent conductive layer includes a transparent pixel electrode and a second portion of the transparent conductive layer includes a capacitor electrode portion, the capacitor electrode portion being electrically isolated from the pixel electrode, and a via, the via for electrically coupling the gate metal to the capacitor electrode portion.

16. The method as recited in claim 15, wherein the transparent layer includes indium tin oxide.

17. The method as recited in claim 15, wherein the transparent layer includes indium zinc oxide.

18. The method as recited in claim 15 further comprising the step of forming the via with the transparent conductive layer.

19. The method as recited in claim 15 further comprising the step of forming a second via for electrically coupling the data metal to the transparent pixel electrode.

20. The method as recited in claim 19 further comprising the step of forming the second via with the transparent conductive layer.

21. The method as recited in claim 15 wherein the data metal includes aluminum.

\* \* \* \* \*